(12) United States Patent
Russ et al.

(10) Patent No.: US 8,103,428 B2
(45) Date of Patent: Jan. 24, 2012

(54) METHOD FOR CONTROLLING AN ENGINE

(75) Inventors: Stephen George Russ, Canton, MI (US); Phil Andrew Fabien, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/004,524

(22) Filed: Jan. 11, 2011

(65) Prior Publication Data

US 2011/0191010 A1    Aug. 4, 2011

(51) Int. Cl.
*G06F 19/00* (2011.01)
*F02M 25/07* (2006.01)
*F02B 47/08* (2006.01)
*F02P 5/15* (2006.01)

(52) U.S. Cl. ............. 701/108; 123/568.21; 123/406.23; 701/103

(58) Field of Classification Search .................. 123/361, 123/396, 399, 403, 406.23, 406.45, 406.48, 123/436, 568.11, 568.21, 568.17, 568.18; 701/101–103, 108, 110, 114, 115; 60/605.2
See application file for complete search history.

(56) References Cited

U.S. PATENT DOCUMENTS

| | | | | |
|---|---|---|---|---|
| 5,060,618 A * | 10/1991 | Takaoka et al. | ............... | 123/436 |
| 5,265,575 A * | 11/1993 | Norota | ............. | 123/436 |
| 5,934,249 A * | 8/1999 | Nanba et al. | ............. | 123/568.21 |
| 6,237,329 B1 * | 5/2001 | Mizuno | ............. | 123/406.48 |
| 6,301,529 B1 * | 10/2001 | Itoyama et al. | ............. | 701/22 |
| 6,338,245 B1 | 1/2002 | Shimoda et al. | | |
| 7,031,820 B2 * | 4/2006 | Ueda et al. | ............. | 701/103 |
| 7,066,158 B2 | 6/2006 | Kuzuyama | | |
| 7,389,751 B2 * | 6/2008 | Leone | ............. | 123/436 |
| 7,484,498 B2 | 2/2009 | Hitomi et al. | | |
| 7,739,026 B2 | 6/2010 | Kuzuyama et al. | | |
| 7,933,713 B2 * | 4/2011 | Leone | ............. | 701/123 |

* cited by examiner

*Primary Examiner* — Willis Wolfe, Jr.
(74) *Attorney, Agent, or Firm* — Julia Voutyras; Alleman Hall McCoy Russell & Tuttle LLP

(57) ABSTRACT

A method for operating an engine is disclosed. In one example, the method adjusts a torque limit of the engine in response to an amount of EGR in an engine cylinder. The approach may reduce the possibility of pre-ignition for boosted engines.

18 Claims, 3 Drawing Sheets

METHOD FOR CONTROLLING AN ENGINE

BACKGROUND/SUMMARY

Boosted engines offer the performance of larger displacement engines with lower engine pumping work. However, at higher engine loads and lower engine speeds, combustion in an engine cylinder may be initiated automatically without inducing a spark. In particular, an air-fuel mixture may pre-ignite as a result of compressing a higher temperature air-fuel mixture. Pre-ignition of the air-fuel mixture can also further increase cylinder pressures so that cylinder end gases remaining in the cylinder automatically ignite, thereby causing higher levels of engine knock. The possibility of pre-ignition can be reduced or limited via introducing cooled exhaust gas residuals by way of an exhaust gas recirculation (EGR) system to the cylinder. Introducing cooled exhaust gas into a cylinder can slow chemical kinetics, thereby lowering the possibility of pre-ignition. In addition, cooled EGR disperses oxygen within the cylinder and reduces the rate of heat release of a combusted air-fuel mixture so that the possibility of igniting end gases is reduced. But, cooled EGR may not always be available to reduce the possibility of pre-ignition. For example, a sufficient amount of cooled EGR may not be available to limit the possibility of pre-ignition during transient conditions because it may be difficult to adjust the EGR amount to the transient conditions. Further, shortly after an engine start, EGR may not be available in the EGR system because of oxygen may have entered the exhaust system during an engine stop. Accordingly, EGR may be used to help control pre-ignition under some conditions, but it may not be capable of limiting the possibility of pre-ignition during all engine operating conditions.

The inventors herein have recognized the above-mentioned disadvantages and have developed a method for controlling an engine, comprising: adjusting an engine torque limit in response to an amount of EGR in a cylinder of the engine.

The possibility of pre-ignition can be reduced by lowering the engine torque limit of the engine as the amount of EGR in the engine cylinders is reduced. For example, the engine torque limit can be reduced so that cylinder pressures in the engine have less possibility of reaching levels that facilitate pre-ignition when a position of a throttle is quickly adjusted. If the EGR percentage of charge entering engine cylinders cannot be adjusted at a rate that reduces the possibility of pre-ignition, the engine torque limit can be reduced so that cylinder pressures have less possibility of reaching pressures where pre-ignition is likely. Further, if EGR is requested and some air enters the engine intake system through the EGR system rather than EGR, the engine torque limit can be reduced until the air is purged from the EGR system and a full fraction of EGR is present in the cylinder charge. Once the air is purged from the EGR system, the engine torque limit can be increased as the percentage of EGR entering the engine cylinders increases.

The present description may provide several advantages. In particular, the approach can reduce the possibility of pre-ignition during transient conditions. Further, the approach can reduce the possibility of pre-ignition when less than a desired level of EGR is available in engine cylinders. Further still, the approach can be implemented in a variety of ways so that a particular torque actuator is not required to facilitate the approach.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
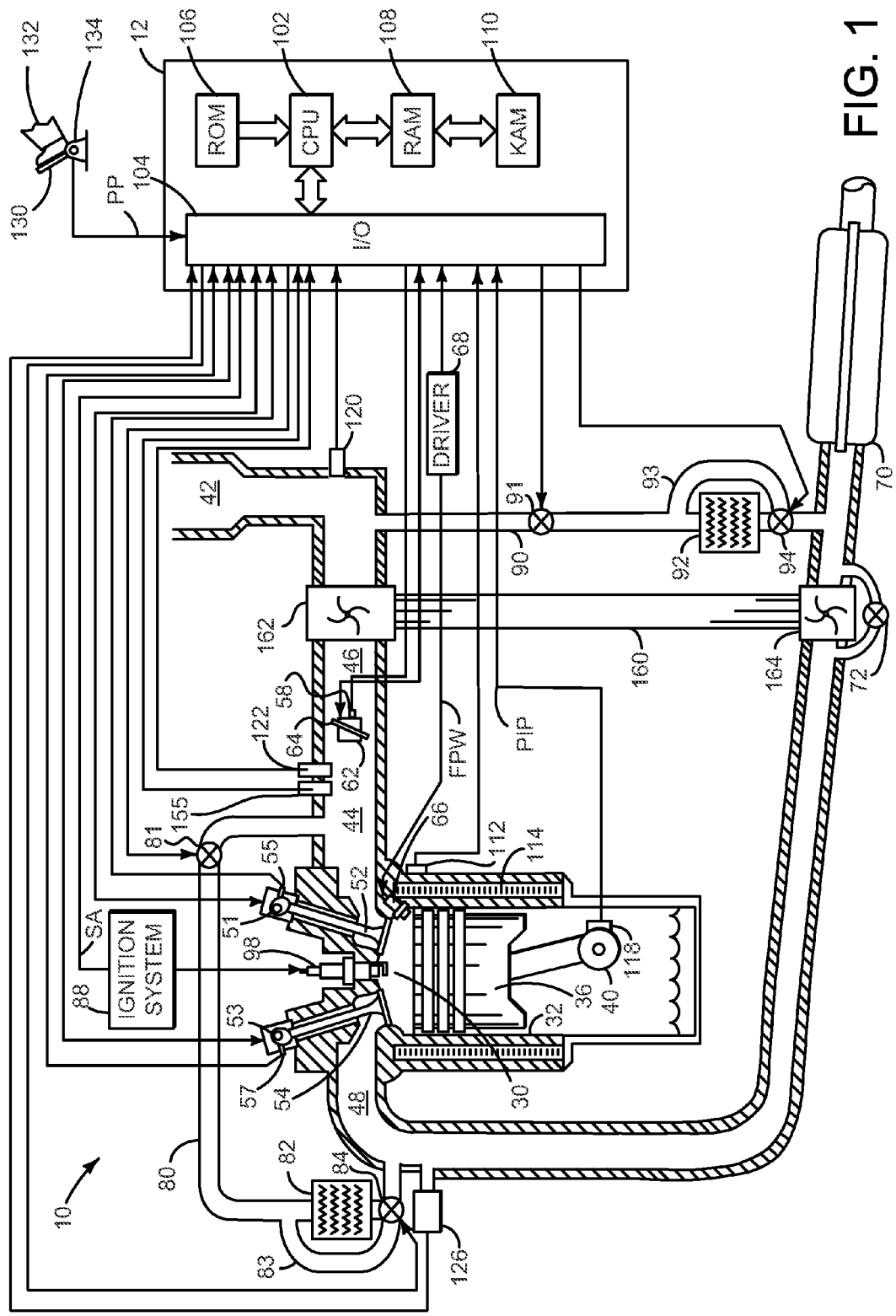
FIG. 1 shows a schematic depiction of an engine.
Figure 2:
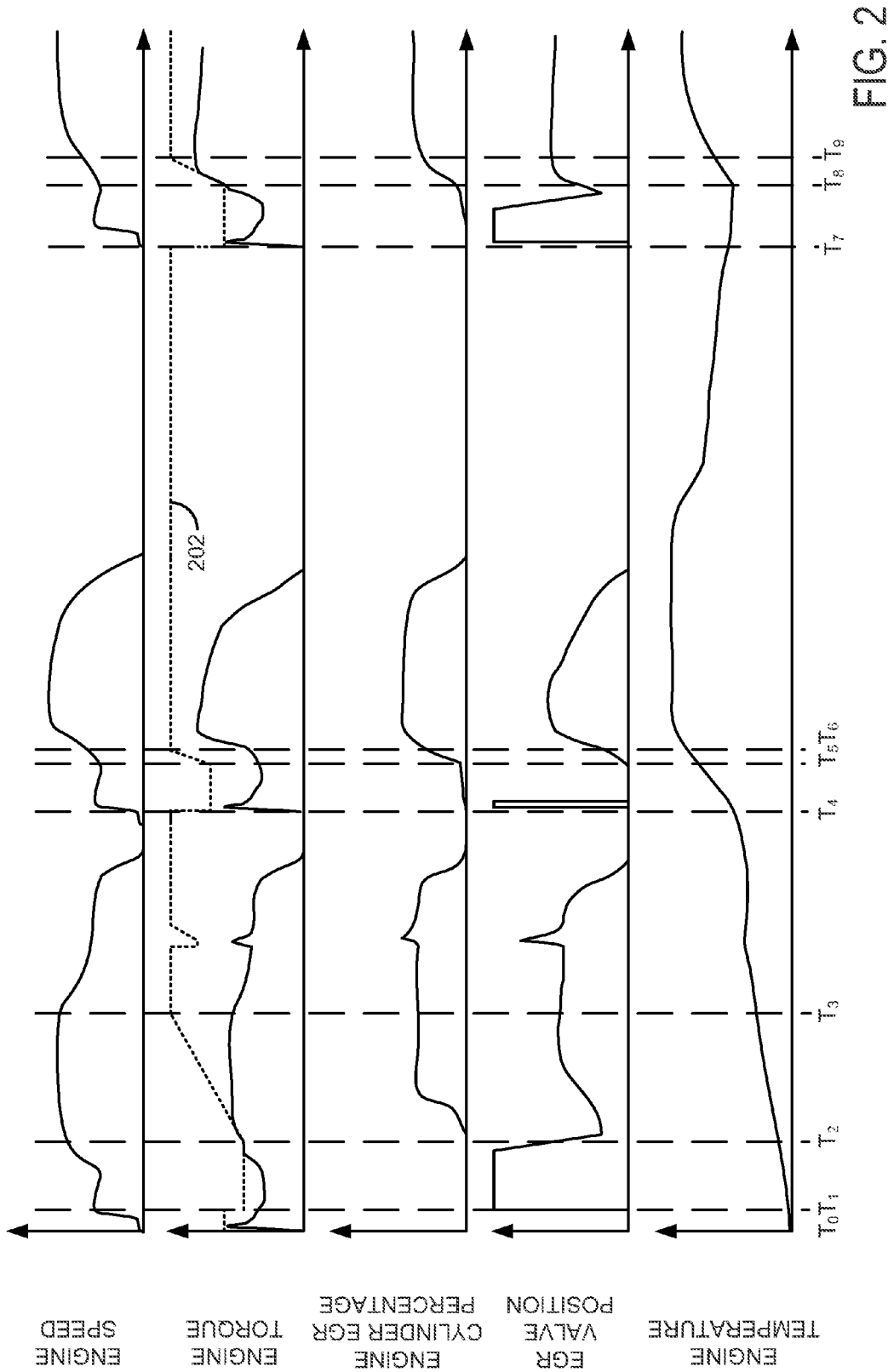
FIG. 2 shows simulated signals of interest during engine operation.

The present description is related to reducing the possibility of pre-ignition in an engine. The approach may be particularly suited for boosted engines as shown in FIG. 1. The approach may be applied to engine systems that use high or low pressure EGR. Alternatively, the approach may be applied to engine systems that use a combination of high and low pressure EGR. FIG. 2 shows simulated signals of interest when controlling an engine according to the method of FIGS. 3.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46 to intake manifold 44.

Compressor 162 draws air from air intake 42 to supply boost chamber 46. Exhaust gases spin turbine 164 which is coupled to compressor 162 via shaft 160. Vacuum operated waste gate actuator 72 allows exhaust gases to bypass turbine 164 so that boost pressure can be controlled under varying operating conditions. Vacuum is supplied to waste gate actuator 72 via a vacuum reservoir and conduit (not shown).

EGR enters the engine air intake system via high pressure EGR tube 80 or low pressure EGR tube 90. Exhaust gases enter high pressure EGR tube 80 via exhaust manifold 48. EGR valve 84 directs exhaust gases to EGR cooler 82 or to bypass passage 83. EGR valve 81 controls the flow rate of EGR from EGR cooler 82 or bypass passage 83 through EGR tube 80. Exhaust gases enter low pressure EGR tube 90 downstream of turbine 164. EGR valve 94 directs exhaust gases to EGR cooler 92 or bypass passage 93 through EGR tube 90. EGR coolers 82 and 92 may cool exhaust gases via liquid coolant or by a combination of air and liquid cooling.

Distributorless ignition system 88 provides an ignition spark to combustion chamber 30 via spark plug 98 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine temperature (ECT) from temperature sensor 112 coupled to cooling sleeve 114; a position sensor 134 coupled to an accelerator pedal 130 for sensing accelerator position adjusted by foot 132; a knock sensor for determining ignition of end gases (not shown); a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); intake manifold oxygen sensor 155 for estimating cylinder and intake manifold EGR concentration; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Thus, the system of FIG. 1 provides for a system for controlling an engine, comprising: an engine, the engine including an intake manifold; an EGR system including an EGR valve in communication with the engine; a torque actuator in communication with the engine; and a controller, the controller including instructions for adjusting a torque limit of the engine via adjusting the torque actuator in response to an amount of EGR available from the EGR system, the controller including further instructions to increase the torque limit of the engine when an amount of EGR available from the EGR system increases. The system further comprises controller instructions to adjust a position of the EGR valve in response to an estimated or measured amount of air in an EGR passage, and further comprising controller instructions to increase the torque limit of the engine while a temperature of the EGR is less than a threshold temperature. The system further comprises an air intake system and a throttle, and where EGR is introduced to the air intake system at a location upstream of the throttle. The system includes where the controller includes further includes instructions for limiting spark timing advance of the engine in response to the torque limit. The system includes where the controller includes further instructions for adjusting the torque limit in response to a temperature of the engine. The method includes where the torque actuator is a throttle or a turbocharger compressor.

Figure 3:
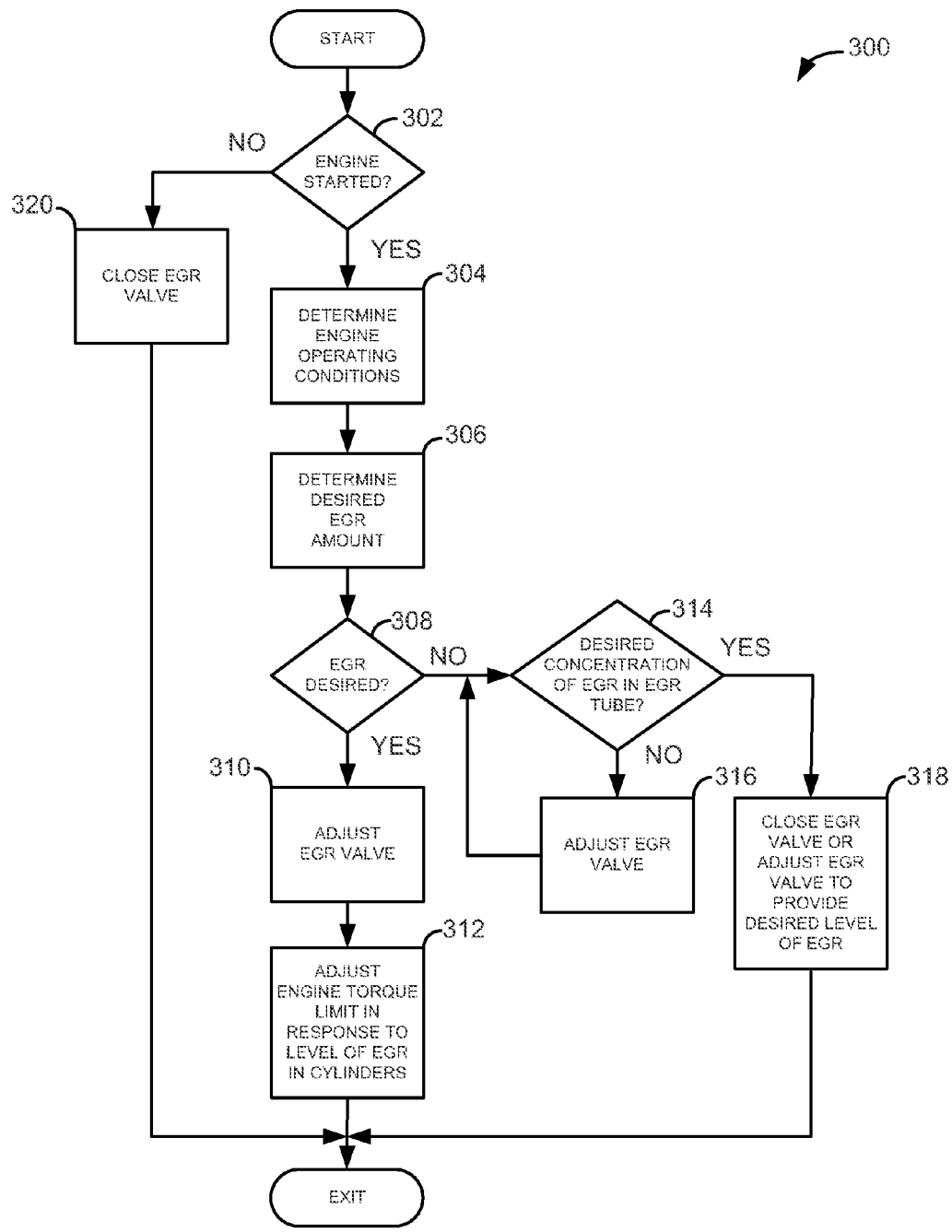
FIG. 3 shows a high level flowchart of a method for operating an engine to reduce the possibility of pre-ignition.

Referring now to FIG. 2, simulated signals of interest during engine operation are shown. Vertical markers $T_0$-$T_9$ identify particular times of interest during the operating sequence. Similar signals may be observed when the method of FIG. 3 is executed by controller 12 of FIG. 1.

The first plot from the top of FIG. 2 shows engine speed versus time. Time starts at the left side of the plot and increases to the right. Engine speed is at its lowest value at the bottom of the plot and increases to the top of the plot.

The second plot from the top of FIG. 2 shows engine torque versus time. Time starts at the left side of the plot and increases to the right. Engine torque is at its lowest value at the bottom of the plot and increases toward the top of the plot. In some examples, engine torque may be expressed as engine load which is a fraction of a theoretical cylinder air charge in the cylinder. Further, the engine torque level may be related to a desired engine torque determined from an accelerator pedal position and engine speed, for example. Dotted line 202 represents an engine torque limit that may be determined in response to engine operating conditions such as an amount of EGR in engine cylinders.

The third plot from the top of FIG. 2 shows engine cylinder EGR percentage versus time. Time starts at the left side of the plot and increases to the right. EGR percent of cylinder charge mass is at its lowest value at the bottom of the plot and increases toward the top of the plot.

The fourth plot from the top of FIG. 2 shows EGR valve position versus time. Time starts at the left side of the plot and increases to the right. The EGR valve is in a closed position when the EGR valve position signal is at its lowest value at the bottom of the plot. The EGR valve opening amount increases toward the top of the plot.

The fifth plot from the top of FIG. 2 shows engine coolant temperature versus time. Time starts at the left side of the plot and increases to the right.

At time $T_0$, engine cranking begins and engine speed is increased to cranking speed (e.g., 200 RPM). Engine torque starts at a low level and rapidly increases since engine cylinders may be almost filled with air during an engine start. The engine torque limit is adjusted to a level less than full engine torque during cranking and run-up (e.g., the time from cranking until the engine reaches idle speed). The engine torque limit during a start may be a function of engine temperature, ambient temperature, ambient air pressure, and cylinder EGR amount. The EGR valve position is shown initially closed. However, in other examples the EGR valve may be commanded open in response to request to start the engine. Engine temperature is also low at time $T_0$.

At time $T_1$, engine speed reaches the desired idle speed so it may be determined that the engine is started. Engine torque falls and begins to stabilize as engine speed reaches the desired idle speed. The engine torque limit is further reduced once the engine reaches idle speed. If a large engine torque request is made by an operator, the engine torque is limited to a level less than the engine torque limit. The engine torque may be limited via one or more of a combination of reducing the extent that a throttle may be opened, reducing an amount of fuel injected to engine cylinders, constraining valve timing, retarding spark timing, and limiting an amount of boosted air provided to the engine. The engine torque limit is reduced so that a desired level of EGR is present in engine cylinders to reduce the possibility of pre-ignition. The percentage of engine cylinder EGR is shown increasing due to internal engine EGR after the engine is started. The EGR valve position is commanded to an open position so that air may be drawn from the EGR tube that feeds exhaust gas from the engine exhaust system to the engine intake system even though no EGR is requested during the cold engine idle condition. Engine coolant temperature begins to rise as heat from combustion warms the engine.

In the time between $T_1$ and $T_2$, engine speed increases in response to an increase in the requested engine torque. The requested engine torque may be made by an operator or by a controller (e.g., hybrid vehicle controller). Engine torque is allowed to increase to the engine torque limit, but the engine torque is constrained after the engine torque limit is reached. In some examples, the rate at which engine torque is allowed to increase may be related to a distance between the actual engine torque and the engine torque limit. For example, the engine torque may be allowed to follow the requested torque signal until the actual engine torque is within a predetermined range of the engine torque limit. Once the actual engine torque is within the predetermined range of the engine torque limit, the rate of engine torque may be limited by a second engine torque rate of change limit. It can be seen in the second plot from the top of FIG. 2 that engine torque follows the engine torque limit from a time just before time $T_2$ to a time just after time $T_2$. The engine cylinder EGR percentage remains substantially constant between time $T_1$ and time $T_2$. The EGR valve position indicates that the EGR valve starts to close between time $T_1$ and time $T_2$. The EGR valve begins to close so that the cylinder charge mixture does not become over dilute. In addition, the EGR valve closes because the amount of air in the EGR tube is reduced to a desired level. As such, when additional EGR is subsequently requested, EGR is available to the engine rather than a slug of air followed by EGR.

At time $T_2$, engine speed is greater than idle speed and engine torque increases further as the engine torque limit begins to increase. The engine torque limit is shown as ramping after time $T_2$; however, engine torque may be increased in a non-linear fashion in some examples. The EGR valve continues to close after time $T_2$, and the engine temperature also continues to increase.

Between time $T_2$ and $T_3$, engine speed increases and levels off. The engine torque also increases and levels off as the engine torque limit continues to increase. Thus, the engine torque follows the engine torque limit until the actual engine torque reaches the desired engine torque, then the actual engine torque follows the desired engine torque. The engine cylinder EGR percentage increases and the EGR valve position indicates that the EGR valve opens further. As engine temperature increases, the engine becomes more tolerant to higher levels of EGR and combustion stability improves.

At time $T_3$, the engine speed is stable and the engine torque limit reaches an upper limit. The engine cylinder EGR percentage reaches an amount in response to engine operating conditions. For example, the engine cylinder EGR percentage is based on engine coolant temperature, engine torque level, and engine speed. The EGR valve position opens to an amount that allows the desired level of EGR to enter engine cylinders via the EGR tube. Engine temperature continues to increase at time $T_3$.

Between time $T_3$ and $T_4$, the engine torque is gradually reduced, but at a time about half way between time $T_3$ and $T_4$, a transient engine torque request is initiated by a torque requestor (e.g., a driver or a controller). In response to the transient torque condition, the engine speed and torque increase. However, the engine torque limit is decreased so that there is time for EGR to pass from the EGR tube to the engine cylinders. As described above, engine torque may be limited by reducing the range of throttle opening amount, retarding spark, limiting the amount of air supplied via boost, limiting cam timing, and reducing the amount of fuel that can be injected to the engine. The engine torque limit is increased shortly after the initiation of the transient torque condition in response to an increasing amount of engine cylinder EGR percentage caused by opening the EGR valve as is shown in FIG. 2 between time $T_3$ and time $T_4$. The EGR valve position and the engine cylinder EGR percentage are reduced after the engine torque transient is over. The engine torque also returns to a lower level.

Shortly after the torque transient takes place, the engine is stopped between time $T_3$ and time $T_4$. The engine is allowed to cool until it is restarted shortly before time $T_4$. During the engine stop period, air may enter the engine exhaust system and EGR tube via diffusion. The exhaust in the exhaust system and EGR tube is slowly replaced by cooler air from the atmosphere. The air can dilute the fraction of EGR in the EGR tube. However, in this example, the engine is stopped for only a short period of time before time $T_4$. Therefore, the exhaust concentration in the exhaust system and EGR tube remains at a high level and the air fraction is small. Nevertheless, the EGR valve is opened from a closed position at the start to evacuate air from the EGR tube. The EGR valve may open in an amount and duration related to an amount of air estimated in the EGR tube. For example, if a small amount of air is estimated to be in the EGR tube, the EGR valve may be opened 25% of the opening amount of the EGR valve for 3 seconds. However, if a larger amount of air is estimated to be in the EGR tube the EGR valve may be opened to 100% of the opening amount of the EGR valve for 5 seconds. The amount of air may be estimated from empirical data. In one example, the amount of air may be estimated based on an amount of time between engine stop and engine start, barometric pressure, and ambient temperature. In the example of FIG. 2, the EGR valve is fully opened for a short period of time to evacuate air that may have accumulated in the EGR tube.

At time $T_4$, engine speed begins to increase as the engine is cranked to restart the engine. The engine torque limit is reduced to reflect that air may have entered the exhaust system and the EGR tube. Engine torque starts at a low level and increases as fuel is injected to engine cylinders for subsequent combustion. The engine cylinder EGR percentage is at a low level to reflect that air is in the engine cylinders and that there is initially a low level of internal EGR. The EGR valve is commanded from the open position to a fully closed condition after a desired amount of air is drawn from the EGR tube into the engine intake system. The air may be drawn from the EGR tube into the engine at a location upstream or downstream of the intake throttle. The engine temperature continues to rise after the engine is restarted and is at a level where the engine torque limit is not reduced in response to the engine temperature.

At time $T_5$, engine speed and engine torque begin to increase in response to a driver or controller command. Further, the engine cylinder EGR percentage begins to increase further as the EGR valve opening amount increases as indicated by the EGR valve position. The engine torque limit increases from time $T_5$ until time $T_6$ where the engine cylinder EGR percentage has increased to a level that supports combustion where there is less possibility of pre-ignition. However, if there is a torque transient above a predetermined level of torque change per unit time, the engine torque level can be reduced as shown between times $T_3$ and $T_4$ to account for transport delay times that may limit the amount of EGR available to engine cylinders during some transient conditions.

At time $T_6$, the engine torque limit is stabilized at a higher level and engine speed and engine torque are gradually reduced until the engine is stopped again as indicated by zero engine speed. The engine cylinder EGR percentage and EGR valve position also go to a level of zero after engine stop. The engine temperature begins to decrease after the engine has been stopped for a period of time.

At time $T_7$, the engine is cranked and the engine is restarted as indicated by increasing engine speed. The engine torque limit is also reduced in response to an amount of EGR in engine cylinders and the available amount of EGR. The amount of EGR in engine cylinders may be estimated in response to an oxygen level measured by an oxygen sensor and a pressure of the intake manifold. Further, a time delay representative of the time it takes for EGR to move from the intake manifold to engine cylinders may also be estimated from engine speed and cylinder valve timing. Thus, in one example, the amount of EGR in engine cylinders can be estimated based on a time delay and measured intake manifold pressure and oxygen concentration. The amount of available EGR may be estimated from an empirically determined amount of EGR in the EGR tube. If the amount of presently available EGR is less than the desired amount of EGR the engine torque limit is reduced.

At time $T_7$, the EGR valve is also commanded to an open position shortly after engine cranking to purge air from the EGR tube. The engine is shown in an off state for a longer period of time between time $T_6$ and time $T_7$. Accordingly, the EGR valve is opened to a greater extent for a longer period of time so that air can be purged from the EGR tube into the engine air intake system. Purging air from the EGR tube allows EGR to enter the EGR tube so that at least some EGR may be available when an engine load higher than idle is requested by an operator or a controller. Since combustion stability and engine emissions may limit the amount of EGR used during combustion at idle conditions, idle conditions are suitable for purging air from the EGR tube. After a desired amount of air is purged from the EGR tube, or when a desired level of EGR is present in the EGR tube, the EGR valve is ramped to a more closed position as shown just before time $T_8$. The engine torque and engine speed also increase in response to a driver or controller command before time $T_8$. The engine torque increases until it reaches the engine torque limit, and then, engine torque follows the engine torque limit so that the engine provides as much torque is possible up to the engine torque limit. If the desired engine torque were to fall to a value less than the engine torque limit, the engine torque would follow the desired engine torque.

Between time $T_8$ and $T_9$, the engine torque limit is increased as the amount of EGR in the engine cylinders increases. The amount of EGR in engine cylinders increases in response to an increasing opening area of the EGR valve. The engine temperature also increases after the engine start; however, the engine temperature at the time of start is high enough not to affect the engine torque limit. For example, the engine temperature is higher than a predetermined threshold so the engine torque limit is not reduced in response to engine temperature.

Thus, FIG. 2 shows signals of interest during one example engine operating sequence. It can be observed from the signals of FIG. 2 that the engine torque limit can be adjusted in response to an amount of EGR in engine cylinders. Further, since EGR cannot flow from the EGR tube to engine cylinders instantaneously, the engine torque limit can be adjusted for transient conditions in a way such that the engine torque limit is initially lowered in response to a transient condition and then increased as EGR flows from the EGR tube into engine cylinders.

Referring now to FIG. 3, a high level flowchart for adjusting an engine toque limit is shown. The method of FIG. 3 is executable by instructions of controller 12 of FIG. 1.

At 302, method 300 judges whether or not the engine is started. In one example, the engine may be judged to be started after engine speed reaches a predetermine speed and while fuel is being injected to the engine. If method 300 judges that the engine is started, method 300 proceeds to 304. Otherwise, method 300 proceeds to 320.

At 304, method 300 determines engine operating conditions. In one example, engine operating conditions may include but are not limited to engine speed, engine torque, desired engine torque, engine temperature, time since engine stop, time since engine start, intake manifold oxygen concentration, and intake manifold pressure. Once engine operating conditions are determined, method 300 proceeds to 306.

At 306, method 300 determines a desired EGR amount for engine cylinders. In one example, the desired amount of EGR entering cylinders may be empirically determined from engine mapping data that reveals engine emissions and combustion stability as related to an amount of EGR in engine cylinders. The desired amount of EGR or the desired percentage of cylinder charge made up of EGR can then be determined from making enquiries of tables indexed by engine speed, engine load, and engine temperature. Further, in some examples a percentage of EGR entering engine cylinders can be made as a function of time since engine stop or start. Method 300 proceeds to 308 after the desired amount of EGR is determined.

At 308, method 300 judges whether or not EGR is desired. In one example, EGR may not be desired until the engine is operating for a predetermined amount of time so that combustion stability is ensured. Further, in some examples, EGR may not be desired until the engine is operating above a predetermined temperature. If method 300 judges EGR is desired, method 300 proceeds to 310. Otherwise, method 300 proceeds to 314.

At 310, method 310 adjusts the position of the EGR valve to deliver a desired EGR percentage of the charge entering cylinders. For example, EGR may be adjusted to comprise 15% of a charge gas mixture mass that enters engine cylinders. The position of the EGR valve may be determined from a table that provides an EGR valve position based on a pressure difference across the EGR valve and a desired EGR flow rate. The EGR valve is commanded to a position to provide the desired flow rate of EGR to the engine, and the position of the EGR valve may be closed loop controlled to provide the desired concentration of EGR in engine cylinders. Method 300 proceeds to 312 after the position of the EGR valve has been adjusted to provide a desired concentration of EGR in engine cylinders.

In one example, the flow rate of air entering engine cylinders is determined from a manifold absolute pressure (MAP) transducer or a mass air flow (MAF) sensor and the flow rate of EGR entering the engine intake system is adjusted to provide the desired fraction of EGR in engine cylinders. For example, if 0.0044 Kg/s of air is drawn into an engine, 0.00044 Kg/s of EGR is required to enter the engine to provide a cylinder charge that is comprised of 10% EGR.

At 312, method 300 adjusts an engine torque limit in response to an amount of EGR present in engine cylinders. In other words, the engine torque limit can be reduced to a greater extent based on a decreased amount of EGR entering an engine cylinder as compared to a desired amount of EGR entering the engine cylinder. Further, the engine torque limit can be increased to a greater extent based on an amount of EGR entering engine cylinders that is increasing toward a desired amount of EGR entering engine cylinders. However, the amount of EGR entering engine cylinders may be limited based on a level of desired combustion stability. The desired level of EGR entering a cylinder includes considerations for combustion stability.

In one example, the amount of EGR in engine cylinders can be estimated from output of an oxygen sensor and a MAP sensor. In particular, the concentration of oxygen in an engine intake manifold can be determined from the oxygen sensor and the partial pressure of the oxygen can be subtracted from the total pressure of the gas in the intake manifold according to Dalton's law to determine the percentage of charge entering engine cylinders that is comprised of EGR.

Once the amount of EGR entering engine cylinders is estimated or determined, method 300 adjusts the engine torque limit. The engine torque limit may also be adjusted in response to other variables such as a temperature of the engine (e.g., cylinder head temperature or engine coolant temperature) and EGR temperature.

In one example, the estimated or measured amount of EGR entering engine cylinders is compared to the desired level of EGR entering engine cylinders from 306. If the amount of EGR entering engine cylinders is less than the desired amount of EGR entering engine cylinders, the engine torque limit can be reduced in response to the difference between the desired EGR amount and the estimated or measured EGR amount. If the amount of EGR entering engine cylinders is increasing toward a desired level of EGR in engine cylinders, the engine torque limit may be increased as the amount of EGR entering engine cylinders increases. The amount that the engine torque limit is reduced can be empirically determined and stored in tables indexed by engine speed, engine torque, engine temperature, and the difference between the desired EGR amount and the estimated or actual EGR amount. For example, if the desired EGR amount entering engine cylinders is 20% of the cylinder gas mass fraction, and it is estimated that 15% of the fraction of gases entering the engine cylinders is EGR, the engine torque limit may be reduced by 15% of the total engine torque capacity of the engine at the present engine operating conditions. If the EGR valve is opened and the concentration of EGR in engine cylinders increases, the engine torque limit may be reduced by 8% of the total engine torque capacity of the engine at the present operating conditions. In this way, the engine torque limit can be adjusted as the concentration of EGR entering engine cylinders increases.

The engine torque limit can be further adjusted in response to a temperature of the engine. For example, if the engine temperature is at a first temperature the engine torque limit can be reduced by a first amount. If the engine temperature is at a second temperature, higher than the first temperature, the engine torque limit can be reduced by a second amount, less than the first amount. Thus, the engine torque limit can be reduced more and more as engine temperature gets colder.

Further still as noted above, the engine torque limit can be adjusted according to the EGR temperature. For example, if the EGR valve 84 or 94 of FIG. 1 remains in a bypass position when cooled EGR is desired, the EGR temperature may increase to a level where it is desirable to reduce the engine torque limit in response to a difference between a desired EGR gas temperature and an actual or estimated EGR gas temperature. In one example, the amount that the engine torque limit is reduced by 20% for exhaust gas temperature that is 40° C. higher than a desired EGR gas temperature. In other examples where EGR temperature is not estimated or measured, the engine torque limit may be reduced in response to a position of an EGR bypass valve (e.g., 84 and 94 of FIG. 1). For example, if cooled EGR is desired and the EGR bypass valve is stuck in a bypass position, the engine torque limit may be reduced by a predetermined amount (e.g., 30% of the total amount of torque available from the engine). On the other hand, if warm EGR is desired and the EGR bypass valve is stuck in a position where the EGR is cooled, the engine torque limit may be allowed to remain at a level that is not reduced.

The engine torque limit may be imposed by limiting the range of authority of one or more torque actuators, where the torque actuator adjusts engine torque to be at or below the torque limit, even if the operator or another torque requester (such as the transmission, etc.) requests torque above the torque limit. For example, valve timing advance may be limited so that a cylinder may only induct a smaller air charge fraction so as to reduce the cylinder air amount when the engine torque limit is reduced. In another example, the throttle opening area may be limited to an amount less than a threshold opening area to control engine torque. In still another example, an amount of boosted air provided by a compressor may be limited in response to an engine torque limit.

When the engine torque limit is raised or lowered in response to an amount of EGR entering engine cylinders, EGR temperature, or engine temperature the transmission shift schedule and torque converter lock up schedule may also be adjusted. For example, if the engine torque limit is lowered, the transmission may shift earlier (e.g., at lower engine speeds and torque levels) to account for the revised engine torque limit. Further, the transmission torque converter clutch can be locked up at lower engine speeds when the engine torque limit is reduced.

In some examples, the engine torque limit can be adjusted in response to an indication of knock by a knock sensor. For example, if engine knock is detected when the engine torque limit has been adjusted according to an amount of EGR entering engine cylinders, the engine torque limit can be further adjusted in response to an indication of engine knock. For example, if less EGR is entering a cylinder than is desired, the engine torque limit has been reduced, and engine knock is indicated by a knock sensor or ion detector, the engine torque limit can be further reduced so as to further reduce the possibility of engine knock.

In some examples, rather than adjusting the engine torque limit solely or at least partially in response to an amount of EGR entering engine cylinders, the engine torque limit may be adjusted in response to an amount of EGR available from the EGR system. For example, if the engine is cold and there is little EGR in the EGR tube, the engine torque limit may be adjusted to a reduced amount until a higher level of EGR is available to the engine. In some systems that include an EGR cooler, a large volume of gas may have to be displaced from the EGR system before the desired amount of EGR is available from the EGR system. Thus, the EGR system may initially have a low amount of EGR that is available to the engine. Accordingly, the engine torque limit can be lowered when the amount of EGR available to the system is low. As the amount of EGR available to the engine increases, the engine torque limit is increased. Method 300 proceeds to exit after adjusting the engine torque limit.

At 314, method 300 judges whether or not a desired concentration of EGR is in an EGR tube. A desired level of EGR in the EGR tube may be 100% or less EGR as a fraction of the total gas mass in the EGR tube. The desired level of EGR in the EGR tube may be made as a function of engine temperature, time since engine stop and/or start, engine speed, and engine load. If a desired level of EGR is present in the EGR tube, method 300 proceeds to 318. Otherwise, method 300 proceeds to 316.

At 316, method 300 adjusts a position of the EGR valve. In one example, the position of the EGR valve is adjusted in response to a difference between a desired level of EGR in the EGR tube and an estimated amount of air or EGR in the tube. For example, the position of EGR valve can such that the EGR valve is opened to a larger extent as the amount of air in the EGR tube increases. By increasing the EGR opening amount, air in the EGR tube may be drawn into the engine intake system in a shorter time period. The air is drawn into the engine during conditions where the desired EGR level is low or zero (e.g., during idle conditions). In an alternative example, if the gas mass fraction of EGR in the EGR tube is estimated to be a high percentage of the gas mass in the EGR tube, the EGR valve may be opened a small amount to purge air from the EGR tube. It should be noted that the EGR valve can be opened even when there is no EGR demand so that air may be evacuated from the EGR tube. Thus, at least a portion of air entering the engine may comprised of air from the EGR tube when there is no demand for EGR.

The amount of air or EGR in an EGR tube may be estimated in response to an amount of time the engine was stopped before the engine was restarted. In some examples, the amount of air or oxygen in the EGR tube may be determined in response to an amount of fuel injected into engine cylinders (e.g., for diesel engines). Further, the amount of air or EGR estimated to be present in the EGR tube may be adjusted in response to engine temperature and ambient temperature. The longer the engine and exhaust system have time to cool the higher the concentration of air in the exhaust system may be until a time when the exhaust system and EGR tube contain substantially all air. In one example, the amount of air in the EGR tube may be empirically determined after stopping the engine, opening the EGR valve, restarting the engine, and monitoring the amount of air entering the engine cylinders. Method 300 proceeds to 314 after the EGR valve is adjusted.

At 318, method 300 closes the EGR valve or repositions the EGR valve to deliver the desired level of EGR to the engine cylinders. The EGR valve may be completely closed. Method 300 exits after the EGR valve is adjusted to a closed position.

At 320, method 300 closes the EGR valve so that a higher concentration of EGR may stay in the EGR tube while the engine is stopped. If the EGR tube where allowed to stay in an open position, EGR may flow from the EGR tube into the engine intake system. Thus, holding the EGR valve in a closed position requires air to enter the EGR tube via the engine cylinders by way of exhaust valves or by way of the vehicle tailpipe. In this way, a higher fraction of EGR may be made available to the engine after a restart as compared to conditions where the EGR valve is in an open position. Method 300 proceeds to exit after the EGR valve is closed.

Thus, the method of FIG. 3 provides for a method for controlling an engine, comprising: adjusting an engine torque limit in response to an amount of EGR in a cylinder of the engine. The method includes where the EGR is cooled via an EGR cooler, and where the EGR in a cylinder is estimated via an amount of EGR in an intake manifold of the engine. The method of includes where the engine torque limit is decreased in response to a decreasing amount of EGR entering engine cylinders, and where the engine torque limit is increased in response to an increasing amount of EGR entering engine cylinders. The method includes where the amount of EGR entering engine cylinders is limited in response to combustion stability. The method further comprises where the engine is stopped and where the torque limit is adjusted to an amount of EGR in the cylinder after the engine is restarted. The method includes where the engine torque is controlled to the torque less than the torque limit via limiting an amount of fuel injected to the engine. The method includes where the amount of EGR is estimated via a UEGO sensor.

The method of FIG. 3 also provides for a method for controlling an engine, comprising: stopping an engine; adjusting an EGR valve in response to an amount of air in an EGR passage during or after an engine restart of the stopped engine; and adjusting a torque limit of the engine in response to an amount of EGR in a cylinder of the engine during and after the engine restart. The method includes where adjusting the EGR valve includes opening the EGR valve during a start and closing the EGR valve when a desired amount of air is evacuated from the EGR passage. For example, the EGR valve can be closed when an amount of air is replaced with exhaust gas in the EGR passage. The method includes where the EGR enters an air intake system of the engine at a location in the air intake system upstream of a throttle valve. The method includes where the EGR enters an air intake system of the engine at a location in the air intake system downstream of a throttle valve. The method includes where the torque limit is reduced when the amount of EGR in the cylinder is less than a threshold amount of EGR. The method includes where the torque limit is adjusted in response to engine knock. The method includes where engine knock is determined via a knock sensor or an ion detector, and where engine intake valve timing is adjusted in response to the torque limit.

As will be appreciated by one of ordinary skill in the art, the method described in FIG. 3 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for controlling an engine, comprising:
adjusting an engine torque limit in response to an amount of EGR in a cylinder of the engine, where the EGR is cooled via an EGR cooler, and where the EGR in the cylinder is estimated via an amount of EGR in an intake manifold of the engine.

2. The method of claim 1, further comprising where the engine is stopped and where the torque limit is adjusted to an amount of EGR in the cylinder after the engine is restarted.

3. The method of claim 1, where the amount of EGR is further estimated via a UEGO sensor, and where the torque limit is further based on an EGR temperature.

4. The method of claim 1, where the engine torque limit is decreased in response to a decreasing amount of EGR entering engine cylinders, and where the engine torque limit is increased in response to an increasing amount of EGR entering engine cylinders.

5. The method of claim 4, where the amount of EGR entering engine cylinders is limited in response to combustion stability or engine emissions.

6. The method of claim 4, where the engine torque is controlled to a torque less than the torque limit via limiting an amount of air flow to the engine.

7. A method for controlling an engine, comprising:
stopping an engine;
adjusting an EGR valve in response to an amount of air in an EGR passage during or after an engine restart of the stopped engine; and
adjusting a torque limit of the engine in response to an amount of EGR in a cylinder of the engine after the engine restart.

8. The method of claim 7, where adjusting the EGR valve includes opening the EGR valve after the engine restart and closing the EGR valve when an amount of air is replaced with exhaust gas in the EGR passage.

9. The method of claim 8, where the EGR enters an air intake system of the engine at a location in the air intake system upstream of a throttle valve.

10. The method of claim 8, where the EGR enters an air intake system of the engine at a location in the air intake system downstream of a throttle valve.

11. The method of claim 8, where the torque limit is reduced when the amount of EGR in the cylinder is less than a threshold amount of EGR.

12. The method of claim 8, where the torque limit is adjusted in response to engine knock.

13. The method of claim 12, where engine knock is determined via a knock sensor or an ion detector, and where engine intake valve timing is adjusted in response to the torque limit.

14. A system for controlling an engine, comprising:
an engine, the engine including an intake manifold;
an EGR system including an EGR valve in communication with the engine;
a torque actuator in communication with the engine; and
a controller, the controller including instructions for adjusting a torque limit of the engine via adjusting the torque actuator in response to an amount of EGR available from the EGR system, the controller including further instructions to increase the torque limit of the engine when the amount of EGR available from the EGR system increases, and the controller including further instructions for limiting spark timing advance of the engine in response to the torque limit.

15. The system of claim 14, further comprising controller instructions to adjust a position of the EGR valve in response to an estimated or measured amount of air in an EGR passage, and further comprising controller instructions to increase the torque limit of the engine while a temperature of the EGR is less than a threshold temperature.

16. The system of claim 14, further comprising an air intake system and a throttle, and where EGR is introduced to the air intake system at a location upstream of the throttle.

17. The system of claim 14, where the controller includes further instructions for adjusting the torque limit in response to a temperature of the engine.

18. The method of claim 14, where the torque actuator is a throttle or a turbocharger compressor.

* * * * *